(12) United States Patent
Marchandise et al.

(10) Patent No.: US 10,131,453 B2
(45) Date of Patent: Nov. 20, 2018

(54) HALL EFFECT THRUSTER AND A SPACE VEHICLE INCLUDING SUCH A THRUSTER

(71) Applicant: SAFRAN AIRCRAFT ENGINES, Paris (FR)

(72) Inventors: Frederic Raphael Jean Marchandise, Vernon (FR); Vanessa Vial, Vernon (FR); Stephan Zurbach, Vernon (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 0 days.

(21) Appl. No.: 15/547,360

(22) PCT Filed: Jan. 28, 2016

(86) PCT No.: PCT/FR2016/050186
§ 371 (c)(1),
(2) Date: Jul. 28, 2017

(87) PCT Pub. No.: WO2016/120570
PCT Pub. Date: Aug. 4, 2016

(65) Prior Publication Data
US 2018/0022475 A1   Jan. 25, 2018

(30) Foreign Application Priority Data

Jan. 30, 2015  (FR) .................................. 15 50745

(51) Int. Cl.
*F03H 1/00*  (2006.01)
*B64G 1/40*  (2006.01)
*H05H 1/54*  (2006.01)

(52) U.S. Cl.
CPC ........... *B64G 1/405* (2013.01); *F03H 1/0006* (2013.01); *F03H 1/0062* (2013.01);
(Continued)

(58) Field of Classification Search
CPC ..... F03H 1/0062; F03H 1/0068; F03H 1/0075
See application file for complete search history.

(56) References Cited

U.S. PATENT DOCUMENTS

| 3,151,259 A | 9/1964 | Gloersen et al. |
| 2003/0046921 A1 | 3/2003 | Hruby et al. |

(Continued)

FOREIGN PATENT DOCUMENTS

RU    1796777 C    2/1993

OTHER PUBLICATIONS

International Search Report dated Apr. 22, 2016 in PCT/FR2016/050186.
(Continued)

*Primary Examiner* — Gerald L Sung
*Assistant Examiner* — William Breazeal
(74) *Attorney, Agent, or Firm* — Oblon, McClelland, Maier & Neustadt, L.L.P.

(57) ABSTRACT

A Hall effect thruster arranged inside a wall and including a magnetic circuit and an electric circuit including an anode, a first cathode, and a voltage source. The magnetic circuit and the electric circuit are arranged in such a manner as to generate magnetic and electric fields around the wall. In every meridian section, the magnetic circuit presents an upstream magnetic pole and a downstream magnetic pole arranged at the surface of the wall and spaced apart from each other; and the anode and the first cathode are situated on either side of the upstream magnetic pole.

7 Claims, 2 Drawing Sheets

(52) U.S. Cl.
CPC ............ *F03H 1/0068* (2013.01); *H05H 1/54* (2013.01); *F03H 1/0012* (2013.01)

(56) References Cited

U.S. PATENT DOCUMENTS

2006/0186837 A1* 8/2006 Hruby .................. F03H 1/0075
 315/501
2008/0223017 A1 9/2008 Furukawa

OTHER PUBLICATIONS

L. Pekker. et al. "Analysis of Air Breathing Hall Effect Thruster", 42$^{nd}$ AIAA Plasmadynamics and Laser Conference, XP55212516, 2011, pp. 1-15 (with Report Documentation Page).

* cited by examiner

HALL EFFECT THRUSTER AND A SPACE VEHICLE INCLUDING SUCH A THRUSTER

FIELD OF THE INVENTION

The present invention relates to the field of air-breathing Hall effect thrusters.

TECHNOLOGICAL BACKGROUND

Usually, an air-breathing Hall effect thruster comprises:

a nozzle for collecting, accelerating, and ejecting particles by the thruster when it is in operation;

an electric circuit comprising an anode, a cathode downstream from the anode, and a voltage source for emitting electrons via the cathode and attracting electrons via the anode; and a magnetic circuit for generating a magnetic field in the nozzle axially downstream from the anode, the magnetic field being directed in a direction that is substantially radial relative to the thrust axis.

By way of example, such a thruster is described in Document US 2003/0046921.

In practice, the nozzle is generally annular in shape to enable the magnetic circuit to generate a radial magnetic field. The nozzle thus comprises both an inside wall and an outside wall; the particles pass between these two walls.

In particular, because of that nozzle, a particularly large amount of the inside space of a space vehicle including such a thruster is already occupied.

SUMMARY OF THE INVENTION

Consequently, the object of the invention is to provide a Hall effect thruster occupying less space in the space vehicle in which it is mounted.

This object is achieved by means of a Hall effect thruster for developing thrust along a thrust axis and comprising:

a magnetic circuit for generating a magnetic field; and an electric circuit comprising an anode, a first cathode, and a voltage source for emitting electrons via at least the first cathode and attracting electrons via the anode;

the thruster being characterized in that:

it is arranged inside a cylindrical wall formed around the thrust axis;

the magnetic circuit and the electric circuit are arranged so as to generate magnetic and electric fields around the wall; and in all sections parallel to the thrust axis and perpendicular to the wall:

the magnetic circuit presents an upstream magnetic pole and a downstream magnetic pole arranged substantially at the surface of the wall and spaced apart from each other; and the anode and the first cathode are situated on either side of the upstream magnetic pole.

The above-mentioned wall is naturally the outside wall of the space vehicle on which the thruster is mounted.

It is usually an axisymmetric wall.

In particular, the wall may be a cylindrical wall. The term "cylindrical wall" is used herein to mean a wall of surface that is generated by sweeping a "generator" line of constant direction around a closed outline.

The thrust developed by the thruster is generally oriented along the axis of symmetry of the wall.

Nevertheless, in an embodiment, the magnetic circuit and/or the electric circuit is/are arranged in such a manner as to generate a non-axisymmetric magnetic and/or electric field (B and/or E) around the wall. The thrust generated by the thruster then presents a lateral component relative to the axis of the thruster (as defined by the cylindrical wall); it is thus oriented in a direction that slopes a little relative to the axial direction of the cylindrical wall.

The closed outline may be of circular, elliptical, or oval shape, and for example, it may be in the shape of a race track, etc.

The invention thus consists in completely inverting the design of a Hall effect thruster by organizing particle acceleration no longer inside a nozzle, and thus inside the space vehicle, but on the contrary on the outside of the space vehicle.

In accordance with the invention, the magnetic field generated by the magnetic circuit traps electrons over the entire circumference of the vehicle; nevertheless, the field may be of intensity that varies as a function of position around the circumference.

The magnetic circuit is generally arranged in such a manner that the magnetic field is oriented in a direction that is generally perpendicular to the surface of the wall, next to the upstream magnetic pole.

The angle between the wall and the magnetic field lines may differ a little from 90°; particularly, it suffices for it to lie in the range 75° to 105°.

In accordance with the invention, the electric circuit and the magnetic circuit are thus completely modified compared with thrusters of prior art design. Nevertheless, the principle on which the Hall effect engine operates remains substantially identical to that of prior art Hall effect thrusters.

In an embodiment, the electric circuit also includes at least one other cathode, arranged axially downstream from the downstream magnetic pole. This other cathode serves to supply electrons to the particles released downstream from the space vehicle, in order to ensure they are electrically neutral.

The invention also provides a space vehicle incorporating at least one Hall effect thruster as defined above.

BRIEF DESCRIPTION OF THE DRAWINGS

The invention can be well understood and its advantages appear better on reading the following detailed description of embodiments given as non-limiting examples. The description refers to the accompanying figures, in which.

DETAILED DESCRIPTION OF THE INVENTION

Figure 1:
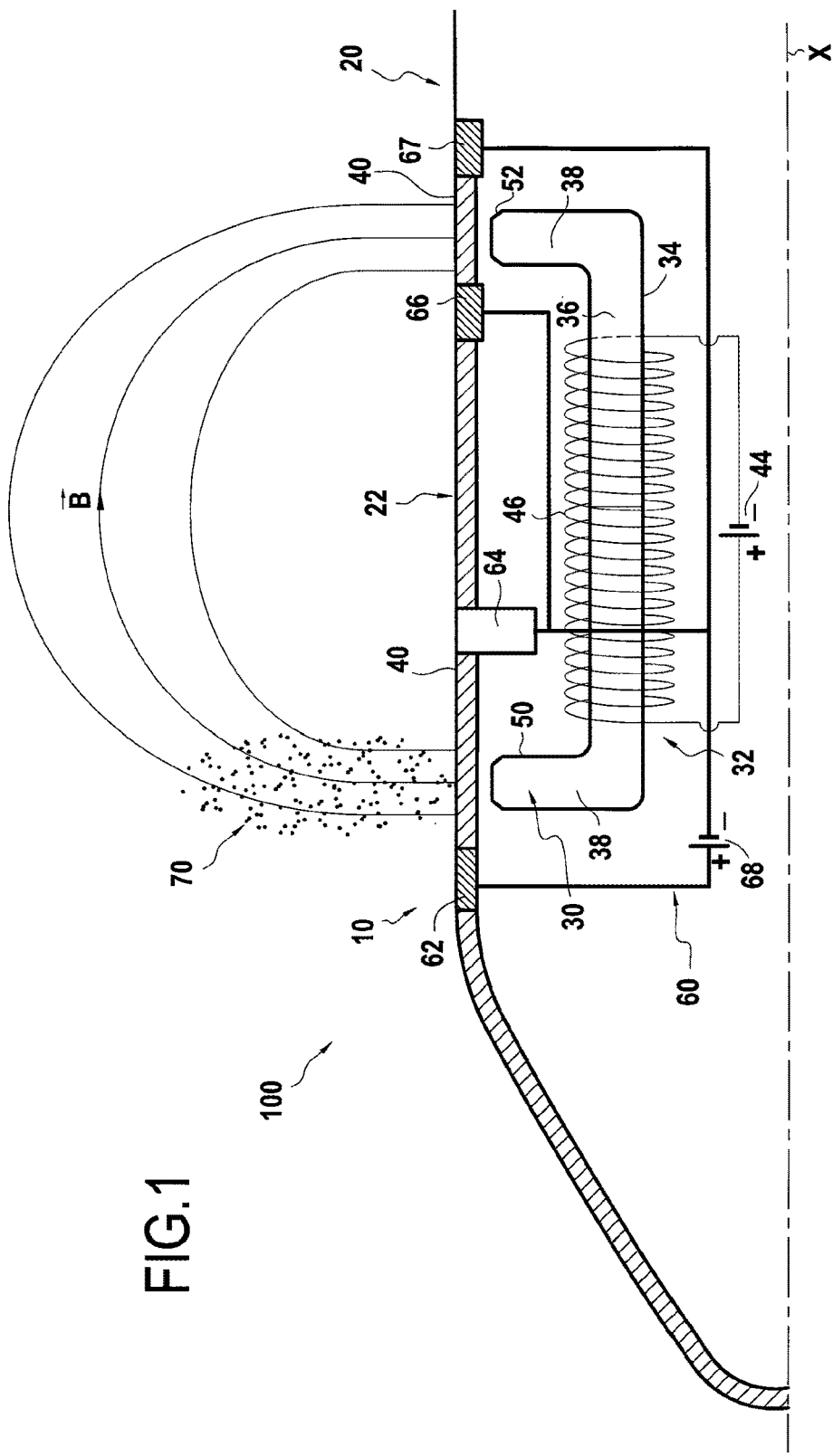
FIG. 1 is a fragmentary section view of a space vehicle incorporating a thruster in accordance with the invention.
Figure 2:
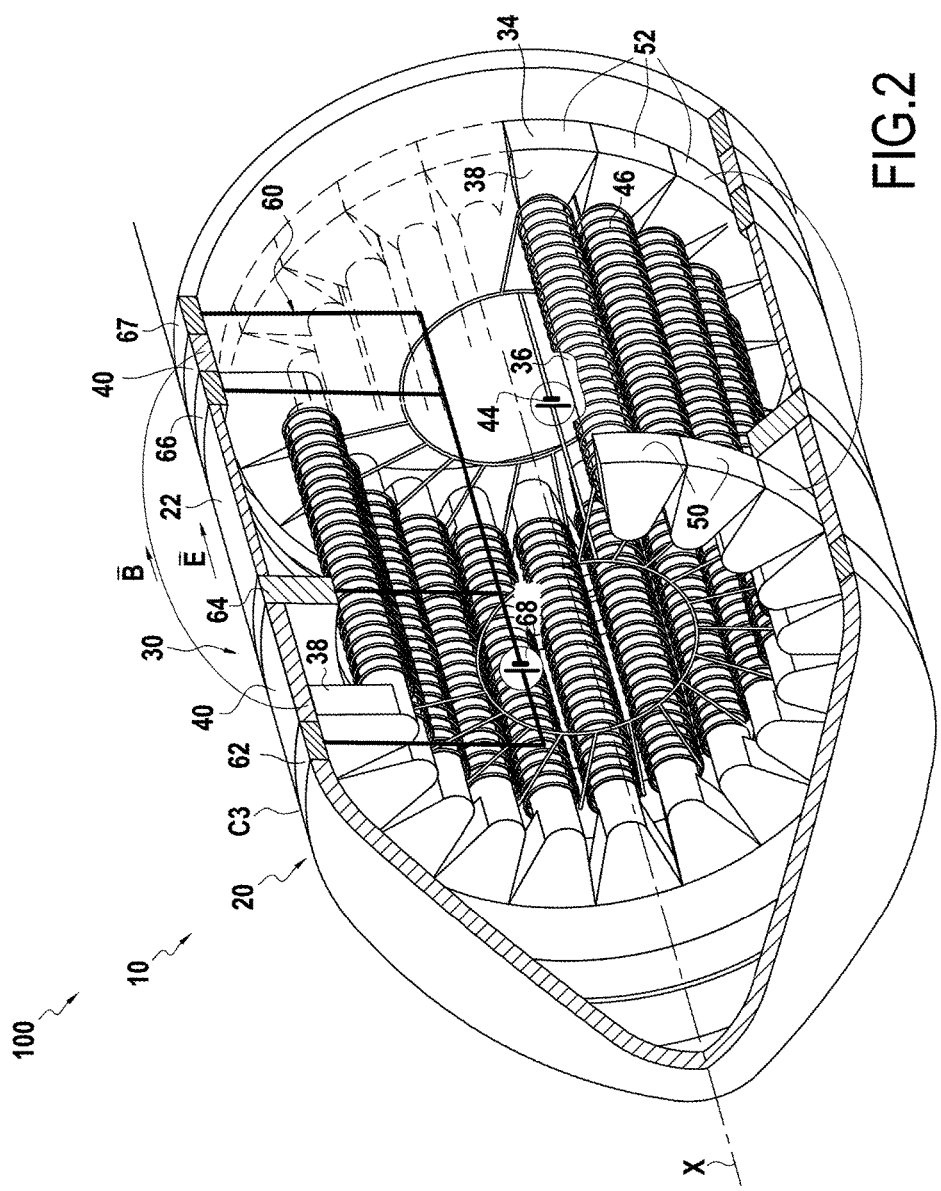
FIG. 2 is a fragmentary perspective view of the space vehicle shown in FIG. 1.

FIGS. 1 and 2 show a space vehicle 100, specifically a satellite, including a Hall effect thruster 10 of the invention.

The satellite is a satellite that is to orbit in the earth's atmosphere and remain at an altitude in the range 100 kilometers (km) to 300 km.

Advantageously, this altitude is relatively low, which enables certain pieces of equipment (communications equipment, cameras, etc.) to be of a size and thus of a mass that are relatively small. Conversely, at this altitude, the earth's atmosphere opposes resistance to the passage of the satellite that is low but not zero. It is therefore necessary to compensate for the resulting drag.

The function of the thruster 10 is to supply the satellite with thrust, enabling it to be maintained in operation at the desired altitude.

It also serves to make orbital changes or corrections.

Advantageously, a thruster of the invention, such as the thruster 10, when coupled to electric energy power supply means such as solar panels, can deliver the thrust needed for keeping the satellite at altitude over long durations.

The satellite 100 is arranged in an outer protective casing 20 that is generally in the form of a body of revolution about an axis X. The thruster 10 is arranged inside the outside wall 22 of the casing 20; the major portion of the wall 22 is of cylindrical outside shape.

In the embodiment described, the thruster 10 has a structure that is axisymmetric about the axis X. In the present context, the terms "upstream" and "downstream" are defined relative to the normal travel direction of the satellite, and thus of the thruster.

The thruster 10 has a magnetic circuit 30 and an electric circuit 60.

The magnetic circuit 30 is arranged so as to create a generally radial magnetic field in the axially upstream portion of the wall 22 ("axially" relative to the axis X).

For this purpose, it has a plurality of identical individual magnetic circuits 32 that are arranged in axisymmetric manner around the axis X.

Each circuit 32 comprises a soft iron core 34 having an axial section that is U-shaped. The core 34 has a long rod 36 that extends parallel to the axis X in the proximity of the wall 22 (in the proximity thereof). It also has two bent segments 38 that are bent towards the wall 22, such that the ends of the segments are arranged immediately under the surface of the wall 22. Facing these segments 38, the casing 20 has rings 40 of non-magnetic electrically-insulating material in order to allow the magnetic field to pass. The rings 40 may for example be made of ceramic, of polycrystalline cubic carbon (better known as diamond) or of alumina.

Each circuit 32 also has a coil 46 forming a solenoid arranged around the rod 36.

The terminals of the coils 46 of the circuits 32 are connected to the terminals of a voltage source 44. The voltage source is selected in such a manner that under the effect of the voltage applied to the coils 46, a stable magnetic field B can be created around the wall. It is also possible to use a current source.

When a voltage is applied by the voltage source 44 to the coils 46, each magnetic circuit 32 generates a magnetic field B. This field is radiated by the circuit 32 to the outside of the satellite 100 in the space beside the satellite. The field lines that are formed are shown in FIG. 1. As shown in this figure, the ends of the bend segments 38 thus form magnetic poles for the circuits 32, i.e. an upstream magnetic pole 50 and a downstream magnetic pole 52.

Next to the upstream magnetic pole 50, the magnetic field B is oriented in a direction that is substantially perpendicular to the surface of the wall 22.

As can be seen in the figure, the upstream magnetic poles of two adjacent individual magnetic circuits 32 are formed so as to be close together, or even, if possible, so as to be in contact. The same goes for the downstream magnetic poles. This enables the magnetic circuit to present an upstream magnetic pole and a downstream magnetic pole in any axial plane, which poles generate the magnetic field. By means of this, the magnetic field B is generated in substantially uniform manner over the entire periphery of the wall 22.

In another embodiment, each circuit 32 may be essentially constituted by a magnet having substantially the same shape as the soft iron core 34. There is then no longer any need to provide coils 46 and a voltage source 44 powering them in order to generate the magnetic field B around the thruster 10.

The thruster 10 also has an electric circuit 60. This circuit comprises an anode 62, a first cathode 64, a second cathode 66, a third cathode 67 (or additional cathode), and a voltage source 68 connecting the anode 62 to the first, second, and third cathodes 64, 66, and 67.

The anode 62 is made of a material that is electrically conductive and preferably non-magnetic, such as for example graphite, stainless steel, or indeed some other metal.

The cathodes are designed to emit electrons, and they may be made of any one of the following materials: lanthanum hexaboride ($LaB_6$), barium-impregnated tungsten (WBa), . . . .

There is no need for the cathodes to be ring-shaped; they could equally well be spot cathodes (hollow cathodes). Specifically, the magnetic topological distance depends on the field lines and not on physical distances. If a cathode is a spot cathode (hollow cathode), the ring 64 has no specific function in the electric circuit; it is possible merely to use a conductive material at the surface in order to avoid electrostatic charges accumulating, as for the wall 22.

The anode 62 is situated axially upstream from the upstream magnetic pole 50. The first cathode 64 is situated downstream from the upstream magnetic pole 50 but in its vicinity (and preferably in its immediate vicinity), and thus at a certain distance upstream from the downstream magnetic pole 52.

The second cathode 66 is situated between the upstream magnetic pole 50 and the downstream magnetic pole 52.

It is thus downstream from the upstream magnetic pole 50 and upstream from the downstream magnetic pole 52.

The third cathode 67 is situated downstream from the downstream magnetic pole 52.

Each of the cathodes 66 and 67 is also situated in the proximity of the downstream magnetic pole 52, and thus at a certain distance downstream from the first cathode 64.

Although the circuit 60 has three cathodes 64, 66, and 67, in other embodiments, it is possible for only one cathode to be provided, or indeed only two cathodes to be provided. The position of the one cathode or the positions of the two cathodes may be selected freely from among the positions of the cathodes 64, 66, and 67.

The anode 62 and the first, second, and third cathodes 64, 66, and 67 are all ring-shaped. Each of these rings extends over the entire circumference of the wall 22, generally in a plane perpendicular to the axis X (or more precisely between two close-together planes perpendicular to the axis X). Each of these rings is flush with the surface of the wall 22 and thus constitutes a portion of the wall.

When a voltage is applied by the voltage source 68 between the anode 62 and the cathodes 64, 66, and 67, an electric field E forms in the space outside the satellite around the wall 22 between the anode 62 and the first cathode 64. This field is oriented substantially in a direction parallel to the axis X.

Conversely, the electric field E is extremely low in the vicinity of the downstream magnetic pole 52. Consequently, the force generated by the thruster 10 is created in the vicinity of the upstream magnetic pole 50, while in the absence of the electric field E, practically no opposing force is generated in the vicinity of the downstream magnetic pole 52.

Finally, it should be observed that the voltage source 68 is controllable (although that is not shown in the figures): its electric voltage may be reversed in order to reverse the thrust from the thruster.

Specifically, its two poles can be interchanged on command so as to reverse, if so desired, the voltage applied between the anode and the first and second cathodes. This reversal serves to reverse the direction of the force applied by the thruster 10, e.g. in order to brake the satellite 100 during re-entry into the atmosphere.

The roles of the anode and of the cathode are then interchanged, if they are of a nature that makes this possible.

In another embodiment, it is possible to make provision for a cathode upstream from the pole 50 and an anode downstream therefrom, with the voltage source 68 being connected thereto in thrust reversal mode.

This cathode and this anode are then used in thrust reversal mode instead of and replacing the anode 62 and the cathodes 64, 66, and 67.

The thruster 10 operates as follows.

A voltage, typically of the order of 150 volts (V) to 800 V is set up between the cathodes 64, 66, and 67 downstream from the upstream anode 62. The cathodes 64, 66, and 67 then begin to emit electrons. A large portion of these electrons are trapped in a magnetic enclosure formed by the magnetic field created by the magnetic circuit 30 and adapted to the desired performance, and which may typically be of the order of 100 gauss to 300 gauss. The electrons trapped in this magnetic enclosure thus form a virtual cathode grid 70. Nevertheless, certain highly energetic electrons (typically 10 electron volts (eV) to 40 eV), escape from the magnetic enclosure 70 and go to the anode 62.

Because the satellite 100 is moving relative to the atmosphere, particles penetrate into the virtual cathode grid 70 at all times. Impacts between the electrons held in the grid and the atoms of those particles cause the atoms to become ionized. Under the effect of the electric field E created by the electric circuit 60, the ionized particles are then accelerated towards the rear of the satellite. The thruster 10 thus generates a plasma jet that is ejected at extremely high speed in the direction X towards the rear of the satellite, downstream from the wall 22. For reasons of symmetry, the thrust that is generated is substantially in alignment with the central axis X.

Depending on the direction of the voltage applied by the voltage source 68, the force generated by the thruster 10 may be in one direction or the other along the axis X.

When the thruster 10 is in operation, the second and third cathodes 66 and 67 supply electrons to the particles released downstream of the satellite 100, thereby ensuring that they are electrically neutral.

The use of the second cathode, in particular, is optional. It is mainly the third cathode 67 situated downstream from the downstream magnetic pole 52 that supplies the electrons needed for neutralizing particles accelerated by the thruster 10.

Advantageously, the thruster of the invention does not require a supply of propulsive gas, unlike most Hall effect thrusters.

Furthermore, its arrangement on the outside wall of the satellite releases a large amount of space inside the satellite, thereby making it possible to install a large payload therein.

Finally, it should be observed that the thruster may be arranged in non-axisymmetric manner, while still remaining within the ambit of the invention. In particular, the coils 46 need not be identical. For example, they may be arranged in such a manner that the magnetic field is more intense on one side of the wall than on the opposite side. Under such circumstances, the thrust generated by the thruster is no longer directed along the axis of the wall, but is oriented with a small bias relative thereto.

The invention claimed is:

1. A Hall effect thruster for accelerating ions to develop thrust along a thrust axis comprising:
   a magnetic circuit for generating a magnetic field; and
   an electric circuit comprising an anode, a first cathode, and a voltage source for emitting electrons via at least the first cathode and attracting electrons via the anode;
   wherein:
      the magnetic circuit is arranged radially inside a wall formed around the thrust axis and the anode and the first cathode lie along the wall;
      the magnetic circuit and the electric circuit are arranged so as to generate magnetic and electric fields surrounding and radially outward of the wall; and
      the magnetic circuit presents an upstream magnetic pole and a downstream magnetic pole arranged at a surface of the wall and spaced apart; and
      the anode and the first cathode are situated on either side of the upstream magnetic pole, wherein acceleration of the ions occurs outside of the Hall effect thruster entirely radially outward of the wall.

2. The Hall effect thruster according to claim 1, wherein the magnetic circuit is arranged in such a manner that the magnetic field is oriented in a direction that is perpendicular to the surface of the wall, next to the upstream magnetic pole.

3. The Hall effect thruster according to claim 1, wherein the electric circuit also includes a second cathode arranged axially between the upstream magnetic pole and the downstream magnetic pole.

4. The Hall effect thruster according to claim 1, wherein the electric circuit also includes an additional cathode arranged axially downstream from the downstream magnetic pole.

5. The Hall effect thruster according to claim 1, wherein the voltage source is controllable, it being possible to reverse the voltage of the voltage source in order to reverse the thrust of the Hall effect thruster.

6. The Hall effect thruster according to claim 1, wherein the magnetic circuit and/or the electric circuit is/are arranged in such a manner as to generate a non-axisymmetric magnetic and/or electric field around the wall.

7. A space vehicle including at least one Hall effect thruster according to claim 1.

* * * * *